US006312153B1

(12) United States Patent
Okada

(10) Patent No.: US 6,312,153 B1
(45) Date of Patent: Nov. 6, 2001

(54) CLOCK OR WATCH HAVING ACCURACY-IMPROVING FUNCTION

(75) Inventor: Setsuo Okada, Hokkaido (JP)

(73) Assignee: Hudson Soft Co., Ltd., Hokkaido (JP)

( * ) Notice: Subject to any disclaimer, the term of this patent is extended or adjusted under 35 U.S.C. 154(b) by 0 days.

(21) Appl. No.: 09/454,411

(22) Filed: Dec. 3, 1999

(30) Foreign Application Priority Data

Dec. 8, 1998 (JP) .................................................. 10-348430

(51) Int. Cl.[7] .................................................. F16B 7/06
(52) U.S. Cl. .................................................. 368/202; 368/47
(58) Field of Search .................................................. 368/202, 201, 368/200, 47

(56) References Cited

U.S. PATENT DOCUMENTS 4,569,598 * 2/1986 Jacobs .................................................. 368/47
5,528,560 * 6/1996 Ogiyama .................................................. 368/47

FOREIGN PATENT DOCUMENTS 6-214059 8/1994 (JP) .
8-101286 4/1996 (JP) .
10-160874 6/1998 (JP) .

* cited by examiner

*Primary Examiner*—Bernard Roskoski
(74) *Attorney, Agent, or Firm*—Scully, Scott, Murphy & Presser

(57) ABSTRACT

A register having a predetermined set value is provided in parallel with a counter for counting a basic signal generated from a crystal oscillator. The register and the counter are connected to a comparator for inputting a count signal into a time-counting circuit every time when the count value of the basic signal in the counter has reached the set value in the register. A signal based on the time-counting signal is sent from the time-counting circuit to a display which indicates time based on the signal. The time indicated on the display is compared with the standard time indicated by a television or the like. In this case, when there is a time difference between the display time and the standard time, a correction value, in terms of the number of seconds, corresponding to the time difference is input through an input unit. The input correction value is calculated in a computing circuit, and is set as a new set value in the register. A time-counting signal based on the newly set value in the register is output from the comparator. This improves the accuracy of the time indicated on the display.

5 Claims, 1 Drawing Sheet

CLOCK OR WATCH HAVING ACCURACY-IMPROVING FUNCTION

FIELD OF THE INVENTION

The present invention relates to a clock or watch having an accuracy-improving function, and particularly to a clock or watch having an accuracy-improving function that can correct, by the correction of an internal mechanism, a time difference between the time indicated on a display and the time signal obtained from a television or the like, thereby improving the time accuracy.

BACKGROUND OF THE INVENTION

For clocks or watches using a crystal oscillator as a time-counting basis, the relationship between the crystal oscillator and a counter for outputting a time signal based on the number of basic signals (oscillation frequency) output from the crystal oscillator is important.

The basic signal sent from the crystal oscillator to the counter should be always kept at a constant cycle. As soon as it becomes impossible to keep this state, an error of the display time occurs.

Since, however, crystal oscillators are influenced by environment, for example, by temperature, humidity, and atmospheric pressure, highly accurate crystal materials are used as the basic signal oscillation source in high-quality clocks and watches, and, in addition, correction means, such as a gateway, for correcting the frequency of the basic signal is interposed between the crystal oscillator and the counter.

According to the conventional clocks or watches, however, high-accuracy crystal and incorporation of frequency correction means have increased the price of the clocks or watches. Therefore, these measures cannot be adopted in inexpensive clocks or watches. This renders the occurrence of a large time difference between the display time and the standard time unavoidable. The lower the price, the lower the accuracy of the clocks or watches.

When game machines are an object for use of the clock or watch, use of inexpensive clocks or watches is a precondition in view of the age of purchasers. The poor accuracy of the clock or watch, however, is in many cases a great hindrance to the development and expansion of game machines. The correction of an error, for example, by a method similar to winding of the stem is not an essential measure because the error occurs again after the passage of time.

SUMMARY OF THE INVENTION

Accordingly, it is an object of the invention to provide a clock or watch having an accuracy-improving function that provides essential measures against an error of the time without need to use high-quality crystal or expensive frequency correction means, such as gateways, and, in addition, based on the measures against an error of the time, enables expansion to game machines.

According to the invention, a clock or watch having an accuracy-improving function, comprises;

a counter for counting a basic signal of a predetermined frequency to provide a counted value;

means for storing a signal number of said basic signal corresponding to a reference time signal;

means for generating said reference time signal to reset said counter when said counted value becomes equal to said signal number;

a time-counting circuit for generating a time by counting said reference time signal;

a display for displaying said time generated by said time-counting circuit;

a manually inputting unit for inputting a time signal to increase or decrease said signal number stored in said storing means and a fast or slow signal; and a control unit including a computing circuit for computing an increasing or decreasing value for said signal number and increasing or decreasing said signal number in said storing means in accordance with said time signal and said fast or slow signal from the manually inputting unit, said predetermined frequency for said basic signal, and an elapsed time from a time when said signal number is formerly stored in said storing means.

The clock or watch having an accuracy-improving function according to the present invention can be, of course, used as a wristwatch, a wall clock and the like. The clock or watch according to the present invention, however, is best suited for use in game machines.

Examples of the standard time include telephone time signals besides television and radio time signals. The difference between the standard time and the time indicated on the display can be confirmed by viewing the display while hearing sound indicating the standard time.

For example, a possible construction is such that, simultaneously with the standard time, the owner depresses a button or the like and the clock or watch per se regards this depression as an instruction for the detection of the time difference, confirms the time difference, and displays this. Selection of this construction or visual confirmation may be determined based on the contemplated level of game properties as the first priority.

The application of the clock or watch according to the present invention to game machines will be explained. In the application of the clock or watch to game machines, a preferred embodiment is such that, upon an instruction by the owner, the clock or watch per se confirms and displays the time difference.

The application of the clock or watch according to the present invention to game machines is based on such a fundamental idea that the difference between the standard time and the display time is gradually decreased by repeatedly correcting the set value of the register, thereby permitting the owner of the clock or watch to foster the accuracy of the clock or watch.

More specifically, the clock or watch may be constructed as follows. For example, if assume that the clock or watch initially causes a delay of five seconds from the standard time at intervals of 6 hr, the set value of the register is repeatedly corrected to gradually decrease the time difference to 4 sec, 3 sec, and 2 sec.

As soon as the time difference reaches a predetermined level, such as ±1 sec, the generation of sound, light or the like informs that the accuracy has reached the predetermined level. The game may be constructed so that the owner can enjoy the care of the clock or watch in the course of improving the accuracy and a sensation of the attainment of the improvement in accuracy by the care, or a sense of game.

A more specific construction is as follows. The clock or watch is carried to a baseball stadium. A button or the like is depressed simultaneously with the confirmation of the time signal by a portable telephone or with the time signal displayed in the baseball stadium, and, as soon as the time accuracy has reached the level of ±1 sec, a rooter's song for a particular baseball team is output from the clock or watch.

A further possible construction of game is as follows. A plurality of clocks or watches are provided. A transmit/receive function is provided in these clocks or watches. At first, the transmit/receive function is sealed. When the time difference reached a predetermined level as a result of the repetition of the correction of the register, the transmit/receive function is unsealed. In this case, a plurality of persons participate the game. This offers more intense sensation of the attainment and sense of game. Possible media for the transmit/receive function include voices or use of letters such as used in pagers.

In the games having the above construction, the following system may also be used. As soon as the time difference reached a predetermined level, a hidden key using numeral values, letters or the like is set in each clock or watch or any clock or watch and, at the same time, a key setting indication signal for informing the completion of the key setting operation is output. Thereafter, the competition for mutually finding the key set in the clock or watch or the keys set in a plurality of the clocks or watches is carried out to unseal the transmit/receive function of the clock(s) or watch(es).

The integration of the game for decreasing the time difference between the display time and the standard time, with the game for finding the key can further enhance the level of the game.

Preferably, the key is automatically set by the clock or watch per se as soon as the time difference has reached a predetermined level. In this case, an instruction function may be incorporated wherein whether or not the key is set is previously selected by an instruction.

Further, the following game construction is considered as a system for further enhancing the level of game. In this system, a pair of watches are provided. These watches are constructed so that a third watch or clock can access to the pair of watches while the owners of these watches are conducting the operation for finding the key. When the third watch has found the key, the transmit/receive function between the pair of watches is locked and broken off.

In this case, the system may be constructed so that the third watch or clock, which has found the key, can communicate with the watch, of which the key has been found, with or without the consent of the owner of the watch, thereby showing off the interruption.

In this connection, a hidden key, which is easy to find, and a hidden key, which is difficult to find, may be set so as to enhance the level of the difficulty of finding the key, thereby increasing the opportunity for the third watch to participate in the game. This construction is effective in enhancing the level of the game.

Another embodiment associated with the application of the invention to game machines will be explained. In this embodiment, a character is displayed on the clock or watch and the character grows with decreasing the time difference between the standard time and the display time. In this case, the state of growth of the character shows the state of fostering of the accuracy. This makes it possible to confirm at a glance the degree of the care of the clock or watch by the owner or the participation of the owner in accuracy improvement.

A further embodiment associated with the application of the invention to game machines is such that calculation means is provided in the clock or watch and, depending upon the degree of a decrease in the time difference, calculation functions, such as addition, subtraction, multiplication, division, trigonometric functions, and exponential calculation, are increased and the grade-up is conducted.

BRIEF DESCRIPTION OF THE DRAWINGS

The invention will be explained in more detail in conjunction with the appended drawings, wherein.

DESCRIPTION OF THE PREFERRED EMBODIMENT

Preferred embodiments associated with the application of the clock or watch having an accuracy-improving function according to the present invention to game machines will be explained with reference to the accompanying drawings.

Figure 1:
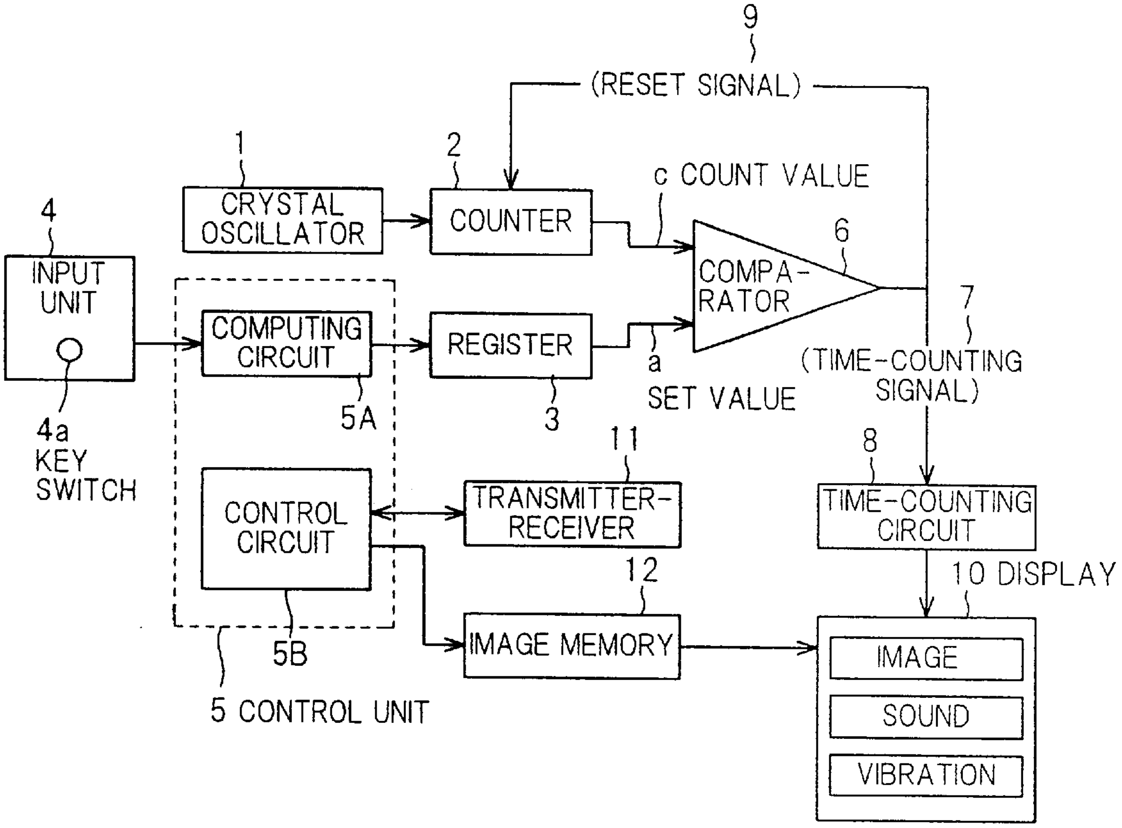
FIG. 1 is a diagram illustrating a preferred embodiment associated with the application of the clock or watch having an accuracy-improving function according to the invention to a game machine.

In FIG. 1, numeral 1 designates a crystal oscillator, numeral 2 a counter for counting basic signals generated from the crystal oscillator 1, and numeral 3 a register. Data input through an input unit 4 is passed through a computing circuit 5A in a control unit 5 and is set as a set value a in the register.

Numeral 6 designates a comparator into which a count value c in the counter 2 and the set value a in the register 3 are input. As soon as the count value c of the basic signal in the counter 2 has reached the setvalue a in the register 3, the comparator 6 outputs a time-counting signal 7 which is input into a time-counting circuit 8.

Further, the comparator 6 outputs a reset signal 9 which is input into the counter 2. This resets the count in the counter 2, the counter 2 again begins to count basic signals, and, when the count has reached the set value a in the register 3, the comparator 6 outputs a time-counting signal 7 and a reset signal 9. This procedure is then repeated.

The time-counting signal 7 is generated, for example, every one sec. The time-counting circuit 8, upon receipt of the time-counting signal 7, sends the signal to a display 10 to indicate the time every one sec.

The control unit 5 has a control circuit 5B in addition to the computing circuit 5A. The control circuit 5B controls a transmitter-receiver 11 for transmitting data to or receiving data from another clock or watch having an accuracy-improving function or the like and an image memory 12 having image data on popular characters or the like.

In the above construction, for example, at 9 o'clock, 12 o'clock or the like after the elapse of a predetermined time, the standard time obtained from a television, a radio or the like is compared with the time indicated on the display 10 to confirm the difference in time therebetween.

Upon the confirmation of the time difference, a key switch 4*a* in the input unit 4 is depressed based on the time difference to input the number of seconds for correction of the time difference. For example, when the time difference is −5 sec, the key switch 4*a* is depressed five times by the corresponding number of seconds. In this case, for example, the system may be constructed so that the number of seconds with respect to gaining ("+"=fast) or the number of seconds with respect to losing ("−"=slow) can be input in terms of the on time to off time ratio of the key switch 4*a*.

Figure 2:
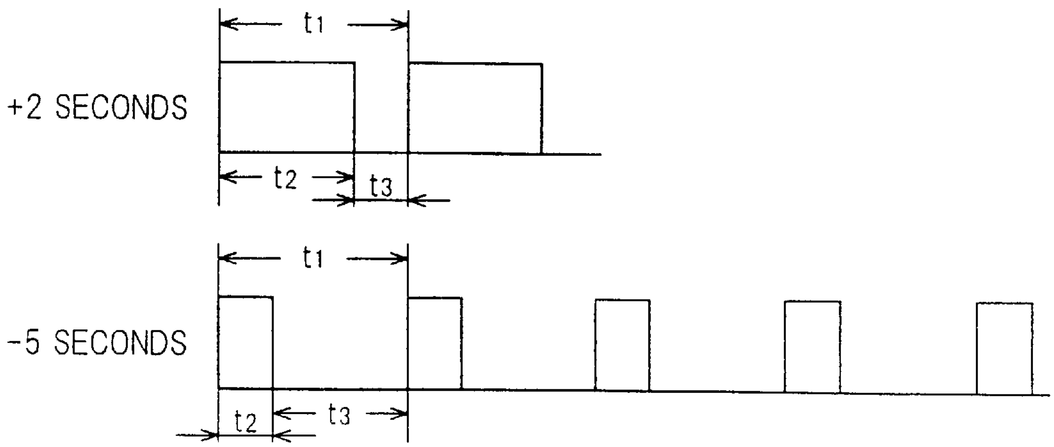
FIG. 2 is a timing chart showing a ratio of the ON period and the OFF period determined in accordance with finger action of an operator.

FIG. 2 shows the first and second cases where the clock or watch is faster than the reference (standard) time by two seconds, and slower than the reference time by five seconds. In the first case, a finger of an operator pushes the key switch 4*a* of the input unit 4 two times, respectively, for the period "$t_2$", and releases it one time for the period "$t_3$", so that two ON signals and one OFF signal are supplied to the computing circuit 5A, where one period "$t_1$", is composed of the periods "$t_2$" and "$t_3$" ($t_2>t_3$). In the second case, the finger pushes it five times, respectively, for the period "$t_2$" and releases it four times, respectively, for the period "$t_3$", so that five ON signals and four OFF signals are supplied to the computing circuit 5A, where one period "$t_1$" is composed of the periods "$t_2$" and "$t_3$" ($t_2<t_3$). As apparent from the above, a kind of skill is required in sensing the periods $t_2$ and $t_3$ to improve the accuracy of the clock or watch for the operator.

The correction value output from the input unit 4 is computed in the computing circuit 5A, and is set as a new set value a in the register 3. The comparator 6 outputs a time-counting signal 7 every time when the count value of the basic signal in the counter 2 has reached a new set value a in the register 3, and, at the same time, sends a reset signal 9 to the counter 2.

Embodiments associated with the correction of the set value a in the register 3 will be explained.

[Where the clock or watch is fast]

Time elapsed until the time difference is confirmed after setting of set value a: 6 hr (21,600 sec)

Difference between the standard time and the time indicated on the display 10: +2 sec Oscillation frequency of the basic signal generated from the crystal oscillator 1: 100,000 Hz Count in the counter 2: (21,600+2)×100,000=2,160,200,000

Original set value a in the register 3: 100,000

New set value a in the register 3 based on the above data:

The count in the counter 2/the number of seconds corresponding to 6 hr=2,160,200,000/21,600=100,009←new set value a Upon input of +2 by the operation of the key switch 4*a* in the input unit 4, the computing circuit 5A computes the above calculation, followed by setting a value of 100,009 in the register 3.

[Where the clock or watch is slow]

Time elapsed until the time difference is confirmed after setting of set value a: 6 hr (21,600 sec)

Difference between the standard time and the time indicated on the display 10: −5 sec Oscillation frequency of the basic signal generated from the crystal oscillator 1: 100,000 Hz Count in the counter 2: (21,600−5)×100,000=2,159,500,000

Original set value a in the register 3: 100,000

New set value a in the register 3 based on the above data:

The count in the counter 2/the number of seconds corresponding to 6 hr=2,159,500,000/21,600=99,977←new set value a Upon input of −5 by the operation of the key switch 4*a* in the input unit 4, the computing circuit 5A computes the above calculation, followed by setting a value of 99,977 in the register 3.

Upon the elapse of a predetermined time after input of the correction value into the input unit 4, the time indicated on the display 10 is again compared with the time signal in the television or the like. In this case, incorporation of difficulties, such as described above, into the input of the correction value into the input unit 4 requires practice for exact correction.

Therefore, the repetition of the practice results in competition for improving the accuracy of the clock or watch. The competition creates a kind of game and, further, comes to have a strong feeling of attachment to the improved accuracy of the clock or watch. It is effective to add such a function that, after standing for a given period of time, the accuracy of the clock or watch is returned to the original low accuracy.

The display 10 may comprise, in addition to the display of time, a vibration generator, a sound generator, and an image display.

When the time difference has become ±1 sec or less based on the correction value input through the input unit 4, the control circuit 5B controls the display 10 so as to generate vibration or sound, or permits image data of popular characters or the like to be output from the image memory 12 for display on the display 10.

Likewise, upon the improvement in accuracy, the transmitter-receiver 11 permits data to be transmitted to or received from another clock or watch having an accuracy-improving function, which, together with the above watch, constitutes a pair watch.

As described above, the clock or watch having an accuracy-improving function of the present invention has such a function that a count signal is output based on comparison of the count value of the basic signal in the counter with the set value in the register and is input into the time display side and, in addition, upon occurrence of time difference between the time indicated on the display and the standard time indicated by televisions or the like, the set value in the register is corrected in response to the input based on the time difference, thereby improving the accuracy of the display time. This construction eliminates the need to use high-quality crystal or to provide expensive frequency correction means, such as gateway, and can improve the accuracy of the clock or watch using an inexpensive construction. This can realize the provision of inexpensive, highly accurate clocks or watches.

Further, the accuracy of the display time can be improved by correcting the set value of the resister based on the input. Therefore, the invention can be applied to game machines for competing the improvement in accuracy based on the correction of the set value. This can realize the provision of new types of game machines not proposed in the prior art.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A clock or watch having an accuracy-improving function, comprising:

a counter for counting a basic signal of a predetermined frequency to provide a counted value;

means for storing a signal number of said basic signal corresponding to a reference time signal;

means for generating said reference time signal to reset said counter when said counted value becomes equal to said signal number;

a time-counting circuit for generating a time by counting said reference time signal;

a display for displaying said time generated by said time-counting circuit;

a manually inputting unit for inputting a time signal to increase or decrease said signal number stored in said storing means and a fast or slow signal; and a control unit including a computing circuit for computing an increasing or decreasing value for said signal number and increasing or decreasing said signal number in said storing means in accordance with said time signal and said fast or slow signal from the manually inputting unit, said predetermined frequency for said basic signal, and an elapsed time from a time when said signal number is formerly stored in said storing means.

2. The clock or watch as defined in claim 1, wherein:

said manually inputting unit is a key switch to be pushed and released respectively for predetermined periods.

3. The clock or watch as defined in claim 1, wherein:

said display generates at lease one of sound, vibration and image, when an accuracy becomes a predetermined level.

4. The clock or watch as defined in claim 3, further, comprising:

a transmitter and a receiver for transmitting information to another clock or watch having an accuracy-improving function, and receiving information from said another clock or watch;

wherein said control unit controls said transmitter and said receiver to transmit information to and receive information from said another clock or watch, when said accuracy becomes said predetermined level.

5. The clock or watch as defined in claim 3, further, comprising:

a memory for storing image data;

wherein said control unit controls said display to display an image in accordance with said image data from said memory, when said accuracy becomes said predetermined level.

* * * * *